United States Patent
Chen et al.

(10) Patent No.: US 7,673,180 B1
(45) Date of Patent: Mar. 2, 2010

(54) METHOD AND APPARATUS FOR DISPATCHING A REMOTE DEBUGGING AGENT IN A DISTRIBUTED COMPUTING ENVIRONMENT

(75) Inventors: Liang T. Chen, Saratoga, CA (US);
Donald J. Kretsch, Cupertino, CA (US);
Christopher D. Quenelle, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 775 days.

(21) Appl. No.: 11/122,432

(22) Filed: May 5, 2005

(51) Int. Cl.
*G06F 11/00* (2006.01)

(52) U.S. Cl. ........................................................ 714/38

(58) Field of Classification Search .................... 714/38
See application file for complete search history.

(56) References Cited

U.S. PATENT DOCUMENTS

2006/0195894 A1* 8/2006 Nita et al. ...................... 726/11

OTHER PUBLICATIONS

"How WER Collects and Classifies Error Reports" May 13, 2004, http://www.microsoft.com/whdc/maintain/WER/ErrClass.mspx.*
"Microsoft Online Crash Analysis" Apr. 23, 2003, http://oca.microsoft.com/en/dcp20.asp.*

* cited by examiner

*Primary Examiner*—Scott T Baderman
*Assistant Examiner*—Jigar Patel
(74) *Attorney, Agent, or Firm*—Osha • Liang LLP

(57) ABSTRACT

A method for dispatching a remote debugging agent (RDA), involving embedding the RDA in a target program to obtain a remotely debuggable target program, submitting the remotely debuggable target program to a distributed computing environment, wherein the distributed computing environment includes a plurality of nodes, executing the remotely debuggable target program on at least one of the plurality of nodes, establishing a connection between the RDA and a central debugging tool, and debugging the remotely debuggable target program using the central debugging tool.

16 Claims, 4 Drawing Sheets

METHOD AND APPARATUS FOR DISPATCHING A REMOTE DEBUGGING AGENT IN A DISTRIBUTED COMPUTING ENVIRONMENT

BACKGROUND

Distributed computing environments have existed for many years. As these environments become mainstream computing platforms, software developers are encouraged to use the distributed features of these environments in more sophisticated ways. In general, there are two types of distributed computing environments. One is implemented with multiple tightly coupled processes, and the other is divided into several loosely coupled processes running on distributed computing machines.

One example of a tightly coupled system is based on MPI (Message Passing Interface). When an application is submitted to an MPI computing environment, an MPI main program creates several MPI processes on appropriate nodes. These processes subsequently run copies of an application on each node, with each copy executing different operations and processing different parts of the application.

An example of a loosely coupled system is a grid environment. When an application is submitted to a grid computing environment, a distributed resource manager schedules and dispatches jobs to run on the most appropriate grid elements. A grid job may be a single process application or an MPI parallel application. Additionally, several applications, each with dependency relationships with other applications, may be executing on various nodes within the grid environment.

When software bugs or failures occur in applications executing in distributed computing environments, remote debugging services need to be available to debug applications on one or more nodes, depending on where the bug/failure occurs. Conventionally, users tend to use simple commands that allow dumping of data, which is subsequently used to locate and repair software problems. Typically, debugging tools are pre-installed on the system used to run the target program. In order to support debugging in a grid computing environment, it is often necessary to install or update the debugging tools on the system running the target program.

SUMMARY OF INVENTION

In general, in one aspect, the invention relates to a method for dispatching a remote debugging agent (RDA), comprising embedding the RDA in a target program to obtain a remotely debuggable target program, submitting the remotely debuggable target program to a distributed computing environment, wherein the distributed computing environment comprises a plurality of nodes, executing the remotely debuggable target program on at least one of the plurality of nodes, establishing a connection between the RDA and a central debugging tool, and debugging the remotely debuggable target program using the central debugging tool.

In general, in one aspect, the invention relates to a system, comprising a target program dispatched in a distributed computing environment comprising a plurality of nodes, a remote debugging agent (RDA) embedded in a target program and configured to provide remote debugging capability, and a central debugging tool configured to communicate with the RDA to debug the target program.

In general, in one aspect, the invention relates to a plurality of nodes, comprising a plurality of remote debugging agents (RDAs), wherein each RDA is embedded in at least one target program and is configured to provide remote debugging capability, and a central debugging tool configured to communicate with the plurality of RDAs to debug the at least one target program, wherein the at least one target program is dispatched in a distributed computing environment comprising the plurality of nodes, wherein each RDA of the plurality of RDAs is executing on one of the plurality of nodes, and wherein the at least one target program is executing on at least one of the plurality of nodes.

Other aspects of the invention will be apparent from the following description and the appended claims.

DETAILED DESCRIPTION

Figure 1:
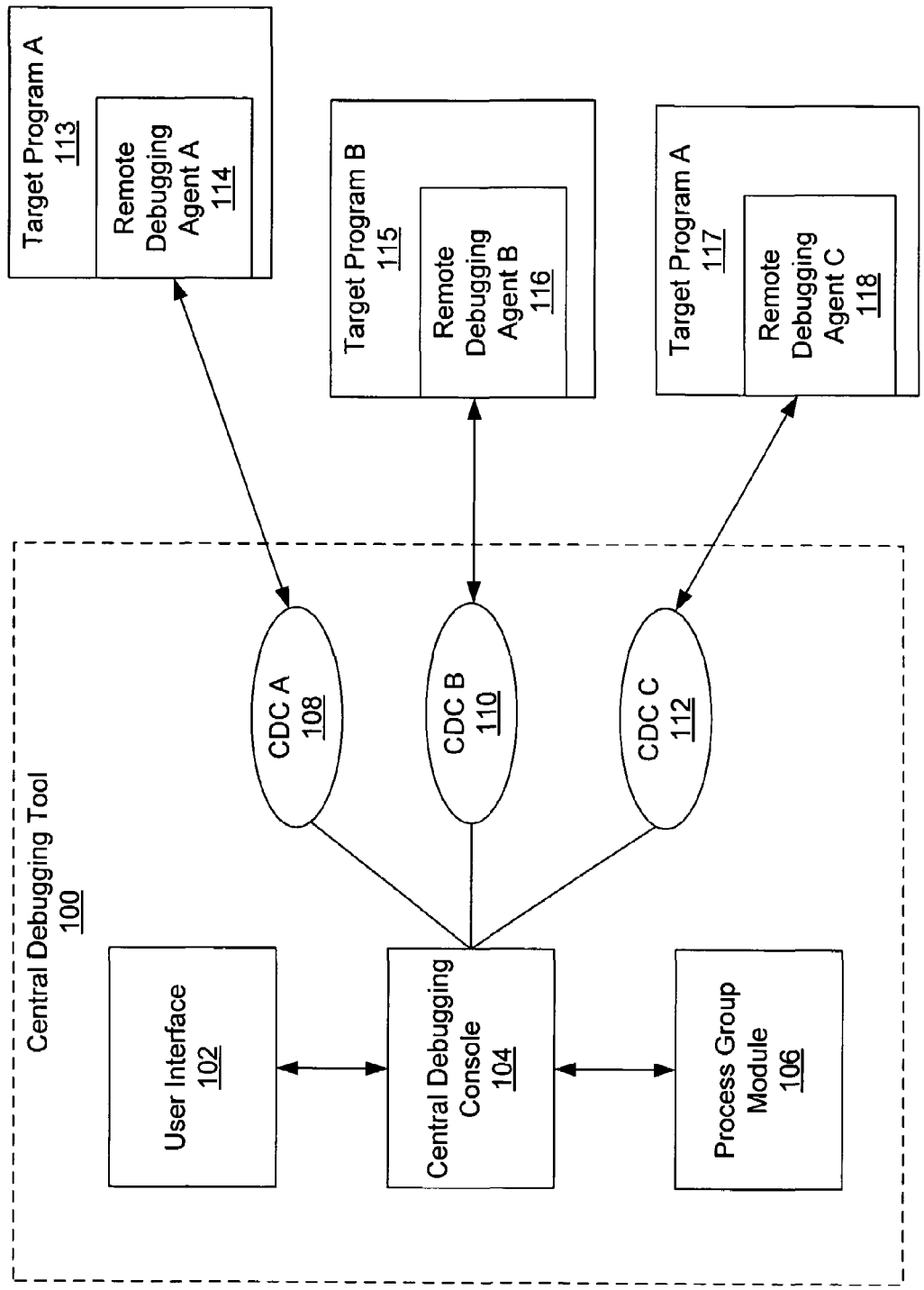
FIG. 1 shows a system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to remote debugging of target programs dispatched in a distributed computing environment. More specifically, embodiments of the invention relate to dispatching a remote debugging agent to execute on remote computing nodes, where the remote debugging agent provides debugging services to debug the target program on one or more remote computing nodes of the distributed computing environment. Further, embodiments of the invention relate a remote debugging agent that is embedded as part of the target program.

FIG. 1 shows a system in accordance with one embodiment of the invention. The system includes a central debugging tool (100), remote debugging agents (RDAS) (i.e., RDA A (114), RDA B (116), RDA C (118)) embedded in target programs (i.e., Target Program A (113), Target Program B (115), Target Program C (117)), and central debugging clients (CDC) (i.e., CDC A (108), CDC B (110), CDC C (112)), where each central debugging client is associated with a corresponding RDA. For example, in FIG. 1, CDC A (108) corresponds to RDA A (114) in Target Program A (113), CDC B (110) corresponds to RDA B (116), in Target Program B (115) and CDC C (112) corresponds to RDA C (118) in Target Program C (117). In one embodiment of the invention, the system of FIG. 1 is used to debug target programs (i.e., Target Program A (113), Target Program B (115), Target Program C (117)) designed to run in distributed computing environments, such as numeric applications, applied physics simulation, molecular cell simulation, integrated circuit design regression testing, financial market case analysis, manufacturing plant operation process analysis, etc.

The target program (113, 115, 117) is an application that is submitted to a distributed computing environment to perform some useful task(s). For example, the target program (113,

115, 117) may be an interactive application that responds to user commands, an application that reads input data files and writes output data files, etc. In one embodiment of the invention, distributed computing environments may include loosely-coupled processes running in a grid computing environment, or multiple tightly-coupled processes, such as message passing interface (MPI) programs. Further, when software bugs or target program failures occur during execution in the distributed computing environment, the RDAs (114, 116, 118) may be used to remotely debug the target program (113, 115, 117) across one or more nodes of the distributed computing environment. For example, programming bugs such as resource corruption, unsynchronized timing, etc., are subtle software problems that may be located within the target program (113, 115, 117) and resolved using the RDA (114, 116, 118).

In one embodiment of the invention, the RDA (114, 116, 118) is a software component that includes code for debugging target programs (113, 115, 117). The RDA code may be any programming style including object-oriented or service oriented code that provides debugging functionality, such as trace-based debugging, source level interactive debugging, etc. The RDA (114, 116, 118) runs on a remote computing node of a distributed computing environment to provide a set of debugging services. Specifically, in one embodiment of the invention, each RDA (114, 116, 118) includes a debugging kernel and a connection server (not shown). The debugging kernel is a light-weight kernel that includes functionality to load and manage symbol mapping data, execute atomic debug commands, probe machine registers and memory states, and handle process I/O. Those skilled in the art will appreciate that the debugging kernel has functionality consistent with debuggers well known in the art. As noted above, the debugging kernel within the RDA (114, 116, 118) may also include functionality to perform trace-based debugging or post-mortem debugging, where the debugging kernel dumps the data of critical regions of code after the target program has failed or stopped executing.

The connection server (not shown) within the RDA (114, 116, 118) is configured to connect and communicate with the central debugging tool (100) and provide remote connection support for the debugging kernel. The RDA (114, 116, 118) may communicate with the central debugging tool (100) through a firewall (not shown). In one embodiment of the invention, the underlying communication mechanism used between the RDA (114, 116, 118) and the central debugging tool (100) depends on the distributed computing environment in which the RDA (114, 116, 118) is dispatched. For example, a grid computing environment may require long distance communication through a firewall. Thus, a heavy-weight connection server that supports secure internet connection, such as HTTPS, may be used for communication between the central debugging tool (100) and the RDA (114, 116, 118). Alternatively, in a multi-process environment using message passing (such as an MPI system), where communication is across shorter distances and with low latency within a firewall, a light-weight socket communication interface may be sufficient. Thus, there are times when access to local computing resources may be needed, and times when access to remote resources may be needed. Further, some remote resources may have boundaries around them that restrict arbitrary access. In any of these cases, the present invention can be used for communication between the central debugging tool (100) and the RDA (114, 116, 118).

In one embodiment of the invention, the RDA (114, 116, 118) is embedded in the target program (113, 115, 117) that is dispatched to the distributed computing environment. Specifically, the RDA code is included as part of the target program (113, 115, 117), enabling the target program (113, 115, 117) to become remotely debuggable. When the target program is compiled, the RDA code is also compiled, forming one binary executable object that is dispatched to the distributed computing environment to be executed on one or more nodes. Those skilled in the art will appreciate that compiling the target program (113, 115, 117) involves linking (i.e., loading libraries and necessary functionality) resulting in the binary executable. In one embodiment of the invention, the target program (113, 115, 117) may be run in both normal mode and RDA mode. RDA mode is activated if debugging services are required to solve software bugs or debug failures in the target program. Alternatively, in one embodiment of the invention, the target program (113, 115, 117) may be run with RDA mode turned off, in which case the target program (113, 115, 117) executes normally without any debug functionality. Further, in one embodiment of the invention, the binary executable object is compiled in such a manner that the addition of the RDA code has a negligible effect on the performance of the binary executable object.

Continuing with FIG. 1, the central debugging tool (100) includes several components. Particularly, as shown in FIG. 1, the central debugging tool (100) includes a central debugging console (104), a process group module (106), and a user interface (102). The central debugging console (104) is the primary component of the central debugging tool (100). In one embodiment of the invention, the central debugging console (104) manages remote debugging resources and executes user requests input through the user interface (102). More specifically, the central debugging console (104) translates user requests to a set of operation commands for the central debugging clients (108, 110, 112) and RDAs (114, 116, 118) to execute. In the opposite direction, the central debugging console (104) includes functionality to aggregate the responses from RDA(s) (114, 116, 118), via the central debugging clients (108, 110, 112), to generate responses to user requests and forward the responses to the user interface (102).

In one embodiment of the invention, the central debugging console (104) includes functionality to create central debugging clients (108, 110, 112), which connect to the RDA(s) (114, 116, 118). In one embodiment of the invention, the central debugging client (108, 110, 112) is a child process created by the central debugging tool (100) to work with a specific RDA (114, 116, 118). Specifically, the central debugging client (108, 110, 112) executes a command from the central debugging console (104) by requesting a set of services of its corresponding RDA (114, 116, 118). Further, the central debugging client (108, 110, 112) reports RDA (114, 116, 118) service failures and any other problems that arise with the RDA (114, 116, 118) to the central debugging tool (100).

As mentioned above, the central debugging tool (100) includes a process group module (106). The process group module (106) acts as an assistant to the central debugging console (104) for managing the groupings of the distributed processes and define work groups. More specifically, processes running on different nodes of a distributed computing environment may be grouped using the process group module (106) to apply particular debugging commands to only those processes defined within the group. Processes outside of the defined group are not affected by debug commands applied to a particular process group. Further, in one embodiment of the invention, the user interface (102) component of the central debugging tool (100) is a plug-in Integrated Development Environment (IDE) user interface module that provides features for a user to manage distributed computing debugging. Features provided by the user interface (102) may include service level interactive debugging environment, monitoring the connection and the state of the RDA (114, 116, 118), displaying aggregated data of a process group, switching of focus context, viewing multiple process states in an aggregated display, providing a message queue window to display the data in MPI message queues, etc.

Those skilled in the art will appreciate that several RDAs may be executing concurrently on several nodes of a distributed computing environment. For example, consider the scenario in which a target program is running on several nodes of a distributed computing environment in parallel. Suppose further that when a software bug or failure occurs, the target program needs to be debugged on several nodes. In this case, multiple RDAs may be instantiated on several nodes to debug portions of the target program in parallel. Alternatively, in one embodiment of the invention, more than one target program may be submitted to a distributed computing environment, where each target program has a dependency relationship with the other target programs. For example, Target Program A may be dependent on Target Program B executing first. In this case, when a software bug/failure occurs, causing one or more dependency relationships to remain unmet, one or more RDAs may be activated in the distributed computing environment to determine the root cause of the problem.

Figure 2:
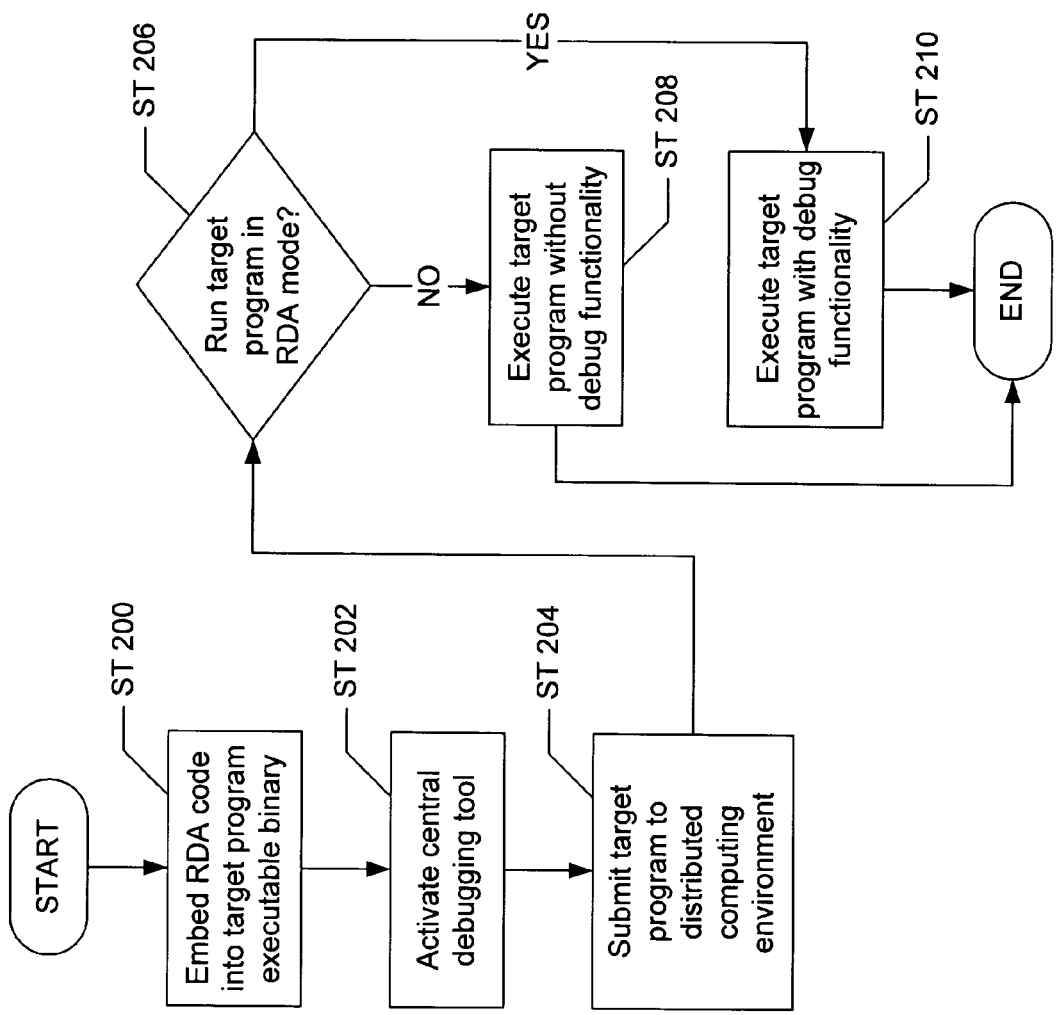
FIGS. 2-3 show flow charts for dispatching a remote debugging agent in accordance with one embodiment of the invention.

FIG. 2 shows a flow chart for dispatching an RDA to a distributed computing environment in accordance with one embodiment of the invention. Initially, as described above, the RDA code is embedded (e.g., by bundling, compiling, etc.) within the executable binary of the target program that is to be dispatched to the distributed computing environment (Step 200). In one embodiment of the invention, embedding the RDA code into the target program allows the target program to be remotely debuggable. Subsequently, the central debugging tool is run (Step 202). In one embodiment of the invention, the central debugging tool may be activated by triggering execution on a computer system located within the distributed computing environment or a computer system that has access to the distributed computing environment but is located remote from the distributed computing environment, waking a thread executing the central debugging tool, etc. Further, activation of the central debugging tool may involve activating the central debugging console, user interface, and process group module. At this stage, in accordance with one embodiment of the invention, the central debugging tool is used to submit the target program, including the embedded RDA, to the distributed computing environment (Step 204). The target program may be submitted to the distributed computing environment in one of several ways. For example, in one embodiment of the invention, the target program job submission may be performed by a separate script that runs in the central debugging tool, a user command input using the user interface component of the central debugging tool, etc.

If the target program is submitted with RDA mode turned on (Step 206), the job submission contains arguments allowing the distributed computing environment to know that RDA mode is turned on. For example, in one embodiment of the invention, if the target program is submitted in the grid environment with RDA mode turned on, the dispatched job carries the debugging flag as an argument. Further, the job submission also includes a connection ID and a security token. In one embodiment of the invention, the connection ID is used by the RDA to establish a secure connection with the central debugging tool (discussed below). The security token carries authentication information, such as a signature and certificate data, to implement the secure connection and encrypted communication between the RDA and the central debugging client. Those skilled in the art will appreciate that if the target program is submitted with RDA mode turned off (Step 206), then the target program executes normally in the distributed computing environment, without any debug functionality (Step 208).

Continuing with FIG. 2, once the target program is submitted into a distributed computing environment with RDA mode turned on, the target program is executed on one or more nodes of the distributed computing environment with the debug functionality (Step 210). In the grid environment, the target program is scheduled by a grid process and executed on an appropriate remote computing node, where the target program is scheduled depending on the resources available on each remote computing node. For example, if the load on a particular remote computing node is low, then the grid environment may schedule the target program on that remote computing node. Subsequently, the RDA portion of the target program executes as the main process, while the target program itself executes as a secondary process. Alternatively, if the distributed computing environment is a multi-process application using message passing (e.g., an MPI program environment), a main program creates multiple processes on appropriate nodes. Each process subsequently runs an instance of the target program. Because the target program includes an embedded RDA, each node of the multi-process application environment runs its own RDA that corresponds to the instance of the target program executing on each node.

Figure 3:
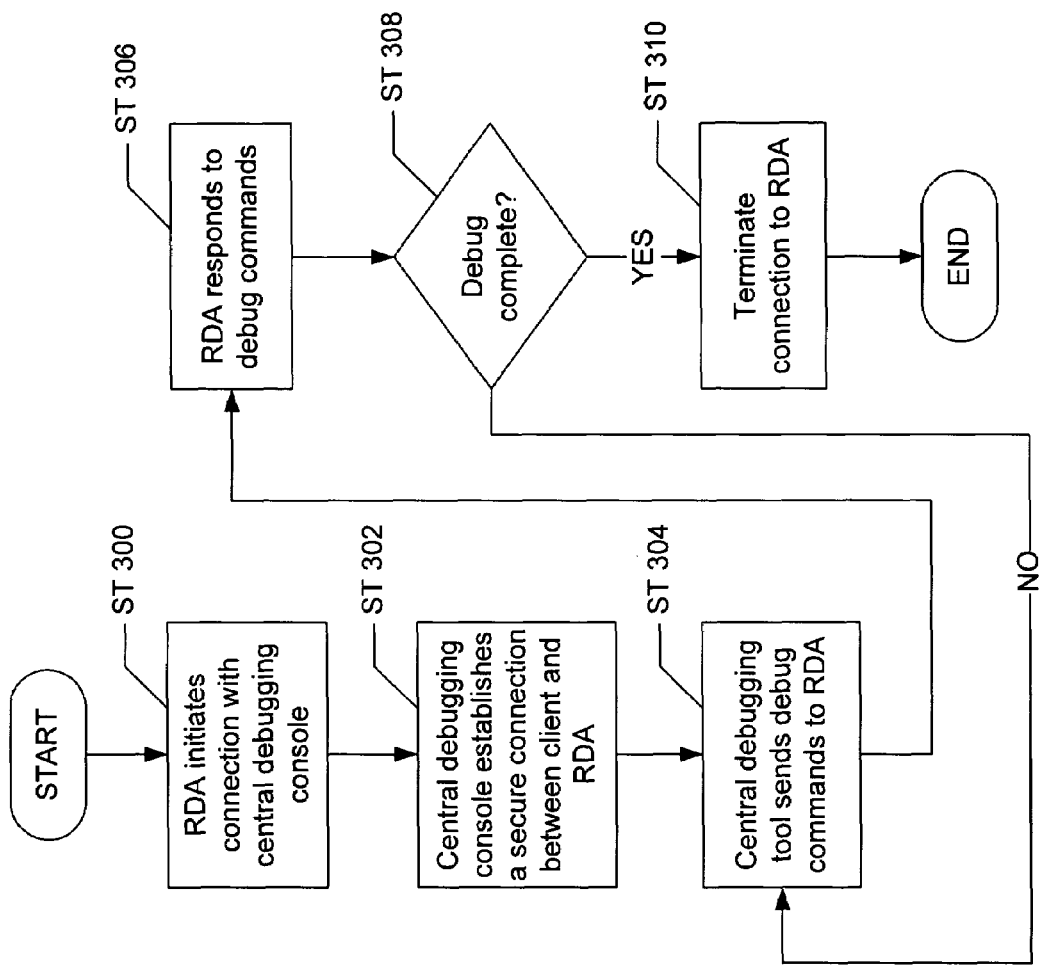

FIG. 3 shows a flow chart detailing the steps required to perform Step 210 of FIG. 2. In one embodiment of the invention, when the RDA begins executing in the distributed computing environment, the RDA initiates a connection with the central debugging tool (Step 300). More specifically, the RDA initiates a connection with the central debugging console, which is identified by the connection ID sent as part of the job submission including the target program. In one embodiment of the invention, in a grid environment, the connection ID is an endpoint reference (i.e., a web service endpoint). A web service endpoint is a referenceable entity that provides the information needed to identify/reference a web service endpoint, and may be used to provide addresses for individual messages sent to and from web services. In a multi-process application using message passing, for example, including the host ID and process ID of the central debugging console as the connection ID is enough information for the RDA to establish a connection with the central debugging clients. At this stage, when the RDA has established a secure connection with the central debugging console, two parts of the system are operating together. The back-end RDA is executing on a remote computing node, and the central debugging tool is executing on a user's computer system and provides the front-end of the system.

Subsequently, the central debugging console creates a central debugging client to work with the RDA and establishes a secure connection between the central client and the RDA (Step 302). In one embodiment of the invention, a central debugging client is created by the central debugging console in various ways depending on the type of distributed computing environment in which the RDA is dispatched. For example, in a grid environment, the central debugging console may include a web service endpoint. A dispatched RDA may request a connection to the web service endpoint, and the central debugging console may create a central debugging client to work with the dispatched RDA in response to the RDA's connection request. Alternatively, in a multi-process application using message passing, the central debugging console may create one or more central debugging clients to work with RDA(s) during initialization of the target program debugging. Those skilled in the art will appreciate that the central debugging console may create several central debugging clients to correspond to several RDAs that may be executing on multiple remote computing nodes to debug a distributed target program.

In one embodiment of the invention, to establish a secure connection in a grid environment, the authentication information (e.g., signatures and certificates) from both the RDA and the central debugging client are exchanged during the initialization of a debugging session to verify authentication. Further, in one embodiment of the invention, every message exchanged in during the debugging session is encrypted. In some distributed computing environments, such as a multi-process application using message passing, the communication between the RDA and central debugging client may occur within a local area network, in which case security protection may not be necessary.

Continuing with FIG. 3, upon establishing a secure connection between the RDA and the corresponding central debugging client, the central debugging tool is used to send debug commands to the RDA to debug the target program (Step 304). Specifically, the user interface accepts user commands to debug the target program. The central debugging console subsequently translates the user commands into a set of operation commands for the central debugging client(s) and the corresponding RDA(s) to execute. The central debugging client(s) executes commands translated by the central debugging console by requesting a set of services from the corresponding RDA(s). Subsequently, the RDA responds to the set of services requested by the central debugging client (Step 306). In one embodiment of the invention, the central debugging client stores the results of the service requests into a pre-assigned data bin for the central debugging console to fetch and assemble. The central debugging console then aggregates the responses stored in the data bin and passes the generated user data to the user interface. Thus, using the process shown in FIG. 3, the central debugging tool provides debug commands that the RDA(s) can understand and execute, and the RDA(s) in turn implement debugging services on remote computing nodes and provide a response to a user associated with the central debugging tool. Those skilled in the art will appreciate that if multiple RDAs are executing on different nodes of a distributed computing environment, the central debugging tool may be used to send different commands to each RDA. Thus, a user may input one set of commands for one particular RDA, and a different set of commands for another RDA.

At this point, if the debugging is complete (Step 308), then the user may terminate the connection to the RDA (Step 310). If the debugging process is not complete, then Steps 304-308 are repeated until the user has completed debugging the target program or wishes to the end the debugging session temporarily. Again, terminating the debugging session may depend on the distributed computing environment in which the RDA is executing. For example, in a grid environment, the user may suspend a debugging session by terminating the connection to the RDA and the central client. Specifically, the central debugging console issues a termination command to the RDA via the central debugging client, which terminates the connection between the RDA and the corresponding central debugging client. At a later time, the user may initiate a new debugging session. In one embodiment of the invention, to configure the system for a suspend/resume of a debugging session, the central debugging client includes functionality to store its current state and communication data to permanent storage before suspending the connection with the RDA. In suspended mode, the RDA remains alive, and waits for a resume message from the central debugging tool. When the user resumes a debugging session, the central debugging console creates a new central debugging client using the stored data and sends a message to the RDA to re-establish a secure connection with the new central debugging client. Further, in one embodiment of the invention, a user may end the entire debugging process by terminating the RDA and the central debugging client.

Alternatively, in a multi-process application using message passing, when the user terminates a debugging session, the main program terminates all the processes running RDA on every node and the local connection to each process. When a user restarts a new debugging session, the main program creates the processes on the appropriate nodes again, and the new processes run the RDA and re-establish a local connection to a new central debugging client.

Those skilled in the art will appreciate that multiple target programs may be submitted to a distributed computing environment. For example, in a grid environment, a user (using the central debugging tool) may instruct the grid environment to run multiple target programs, where each target program is related to each of the other target programs. Specifically, dependency relationships may exist amongst some or all of the job submissions. In this case, the user may provide instructions to the grid environment to correlate each target program according to the dependency relationships defined. Further, each target program executes on a different remote computing node and includes a separate RDA. When debugging such a set-up, a user may use known dependency relationships to debug one or more target programs using corresponding RDAs.

While discussing the distributed computing systems in the present application, specific reference is made to grid and MPI environments. However, those skilled in the art will appreciate that the present invention is similarly applicable to any environment involved with a distributed computing architecture.

Figure 4:
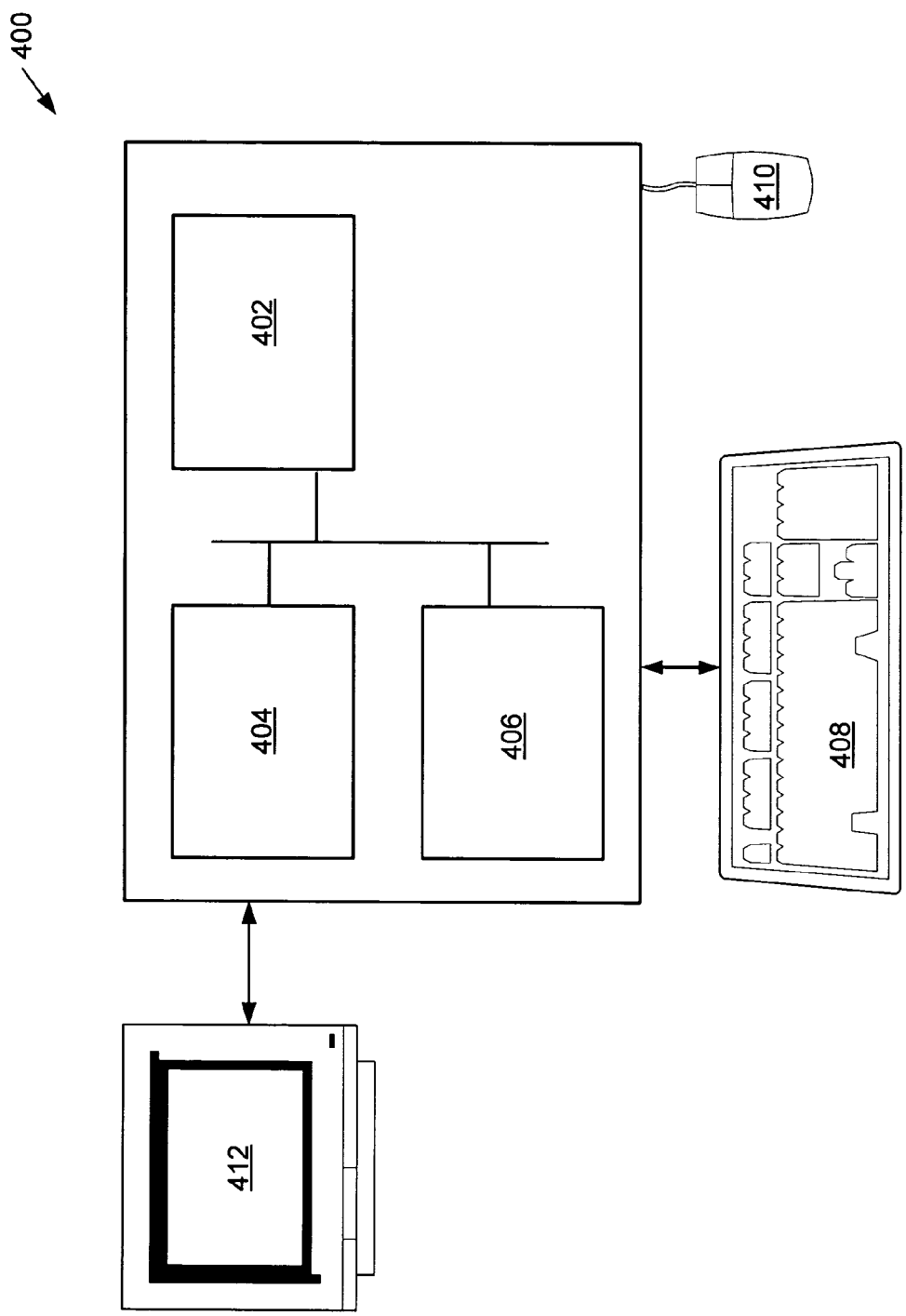
FIG. 4 shows a computer system in accordance with one embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a method for efficient debugging of remote programs executing in a complex distributed computing environment. Specifically, embodiments of the invention provide an efficient debugging tool that allows a user to track and debug a dispatched remote job in a distributed computing environment. One or more embodiments of the invention allow for a well controlled debugging session to isolate and fix software problems with a portable user interface. By providing a remote debugging agent that is built into an executable object, embodiments of the invention eliminate software versioning and installation requirements. Further, embodiments of the invention allow for large scalability to debug applications executing in parallel on several computing nodes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dispatching a plurality of remote debugging agents (RDAs), comprising:
    embedding RDA code for the plurality of RDAs in a target program to obtain a remotely debuggable target program;
    submitting the remotely debuggable target program to a distributed computing environment, wherein the distributed computing environment comprises a plurality of nodes;
    executing the remotely debuggable target program, in parallel, on the plurality of nodes, wherein executing the remotely debuggable target program comprises executing an instance of the remotely debuggable target program on each of the plurality of nodes to create a plurality of instances of the remotely debuggable target program during execution, wherein each instance of the plurality of instances comprises an RDA of the plurality of RDAs, wherein at least two of plurality of instances are interdependent during execution;
    establishing a connection between at least two RDAs corresponding to the at least two of plurality of instances and a central debugging tool; and
    debugging the remotely debuggable target program using the central debugging tool and the at least two RDAs, wherein the central debugging tool corrects the remotely debuggable target program while communicating with the at least two RDAs, wherein the central debugging tool comprises a user interface, a central debugging console, and a process group module, and wherein debugging the remotely debuggable target program comprises:
        accepting, by the user interface, user commands to debug the remotely debuggable target program,
        translating, by the central debugging console, the user commands into at least one set of operational commands,
        executing, by the central debugging tool, the at least one set of operational commands to generate at least two service requests,
        identifying the at least two RDAs of the plurality of RDAs to execute the at least two service requests, and
        wherein the at least two RDAs executes the at least two service requests to debug the remotely debuggable target program.

2. The method of claim 1, further comprising:
    creating a central debugging client on the central debugging tool to debug the remotely debuggable target program, wherein the central debugging client is associated only with an RDA of the at least two RDAs embedded in the target program.

3. The method of claim 2, further comprising:
    establishing a secure connection between the central debugging client and the RDA by authenticating the central debugging client and the RDA.

4. The method of claim 1, wherein submitting the remotely debuggable target program comprises submitting a connection ID and a security token, wherein the security token comprises authentication information.

5. The method of claim 4, wherein the at least two RDAs initiate a connection with the central debugging tool using the connection ID.

6. The method of claim 1, wherein the distributed computing environment is a grid computing environment.

7. The method of claim 1, wherein the distributed computing environment supports multi-process applications using message passing.

8. The method of claim 1, wherein embedding the RDA in the target program comprises compiling RDA code into an executable binary associated with the target program.

9. The method of claim 1, wherein the target program is executed with RDA mode enabled when debugging failures in the target program, and wherein the target program is executed with RDA mode disabled to disable debugging functionality of the RDA.

10. A system, comprising: a computer processor;
    a target program dispatched in a distributed computing environment comprising a plurality of nodes;
        remote debugging agent (RDA) code, for a plurality of RDAs, embedded in the target program executing on a computer system and configured to provide remote debugging capability, wherein the plurality of RDAs are created when the target program is executed, wherein executing the target program comprises executing an instance of the remotely target program on each of the plurality of nodes to create a plurality of instances of the target program during execution, wherein each instance of the plurality of instances comprises an RDA of the plurality of RDAs, wherein at least two of plurality of instances are interdependent during execution; and
    a central debugging tool executing on the computer processor and configured to communicate with the RDA to debug the target program when a failure occurs, wherein the central debugging tool comprises a user interface, a central debugging console, and a process group module, and wherein debugging the target program comprises:
        establishing a connection between at least two RDAs corresponding to the at least two of plurality of instances and the central debugging tool; and
        correcting the failure while communicating with the at least two RDAs, wherein correcting the failure comprises:
            accepting, by the user interface, user commands to debug the target program;
            translating, by the central debugging console, the user commands from the user interface into at least one set of operational commands,
            executing, by the central debugging client, the at least one set of operational commands to generate at least two service requests,
            identifying the at least two RDAs of the plurality of RDAs to execute the at least two service requests, and
            executing, by the at least two RDAs, the at least two service requests to debug the target program while the target program is executing.

11. The system of claim 10, further comprising:
a central debugging client configured to facilitate communication between an RDA of the at least two RDAs and the central debugging tool, wherein the central debugging client is associated only with the RDA embedded in the target program.

12. The system of claim 11, wherein a secure connection is established between the central debugging client and the RDA using a security token submitted with the target program to the distributed computing environment.

13. The system of claim 10, wherein the distributed computing environment supports multi-process applications using message passing.

14. The system of claim 10, wherein the distributed computing environment is a grid computing environment.

15. The system of claim 10, wherein the target program is configured to run with RDA mode enabled when debugging failures in the target program, and wherein the target program is executed with RDA mode disabled to disable debugging functionality of the RDA.

16. A plurality of nodes, comprising:
a plurality of remote debugging agents (RDAs) embedded in a plurality of target programs and configured to provide remote debugging capability, wherein each of the plurality of target programs comprises an RDA of the plurality of RDAs, wherein a first target program of the plurality of target programs is dependent on a second target program of the plurality of target programs during execution of the first target program and the second target program; and a central debugging tool configured to communicate with the plurality of RDAs to debug the first target program and the second target program, wherein the plurality of target programs are dispatched in a distributed computing environment comprising the plurality of nodes to execute on the plurality of nodes, and wherein debugging the first target program and the second target program comprises correcting a failure while communicating with a first RDA of the plurality of RDAs and a second RDA of the plurality of RDAs, wherein the first RDA is embedded the first target program and the second RDA is embedded in the second target program, and wherein correcting the failure comprises:

accepting, by the user interface, user commands to debug the first target program and the second target program;

translating, by the central debugging console, the user commands from the user interface into operational commands, executing, by the central debugging client, the operational commands to generate a service request, and executing, by the first RDA and the second RDA, the service request to debug the target program while the target program is executing, wherein each node of the plurality of nodes comprises a computer processor.

* * * * *